No. 747,304. PATENTED DEC. 15, 1903.
R. C. HILTON.
CUSHION WHEEL AND HUB THEREFOR.
APPLICATION FILED MAR. 13, 1903.
NO MODEL.

Witnesses.
John F. Nelson
Everitt S. Emery

Inventor.
Roland C. Hilton,
by Frederick L. Emery
Atty.

No. 747,304.

Patented December 15, 1903.

UNITED STATES PATENT OFFICE.

ROLAND C. HILTON, OF NEW BEDFORD, MASSACHUSETTS, ASSIGNOR TO LOUIS A. WYMAN, OF LYNN, MASSACHUSETTS.

CUSHION-WHEEL AND HUB THEREFOR.

SPECIFICATION forming part of Letters Patent No. 747,304, dated December 15, 1903.

Application filed March 13, 1903. Serial No. 147,590. (No model.)

*To all whom it may concern:*

Be it known that I, ROLAND C. HILTON, a citizen of the United States, residing at New Bedford, in the county of Bristol and State of Massachusetts, have invented an Improvement in Cushion-Wheels and Hubs Therefor, of which the following description, in connection with the accompanying drawings, is a specification, like letters on the drawings representing like parts.

My invention relates to vehicle-wheels, and especially such as are adapted for use on motor-vehicles. Wheels of this character are usually provided with pneumatic tires; but the liability of these tires to puncture renders them objectionable.

My invention consists in an improved wheel wherein the cushion or yielding action is provided for between the axle and tire, thus enabling a solid unpuncturable tire to be employed.

One embodiment of my invention is illustrated in the accompanying drawings, in which—

Figure 1:
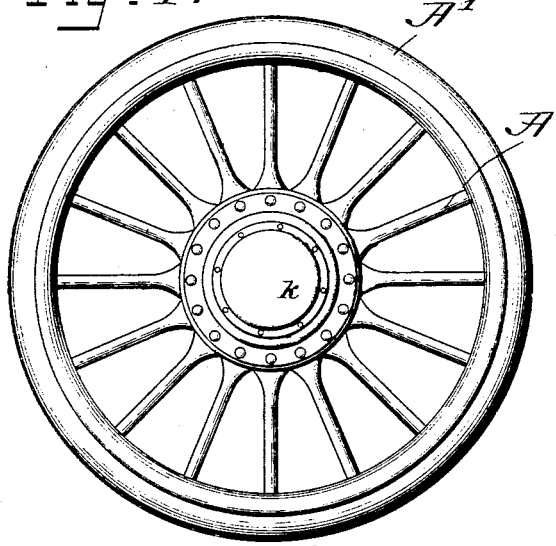
Figure 4:
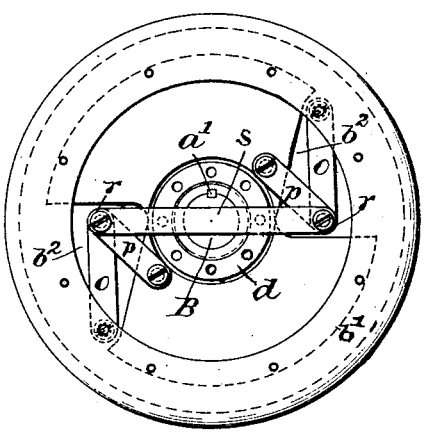
Figure 2:
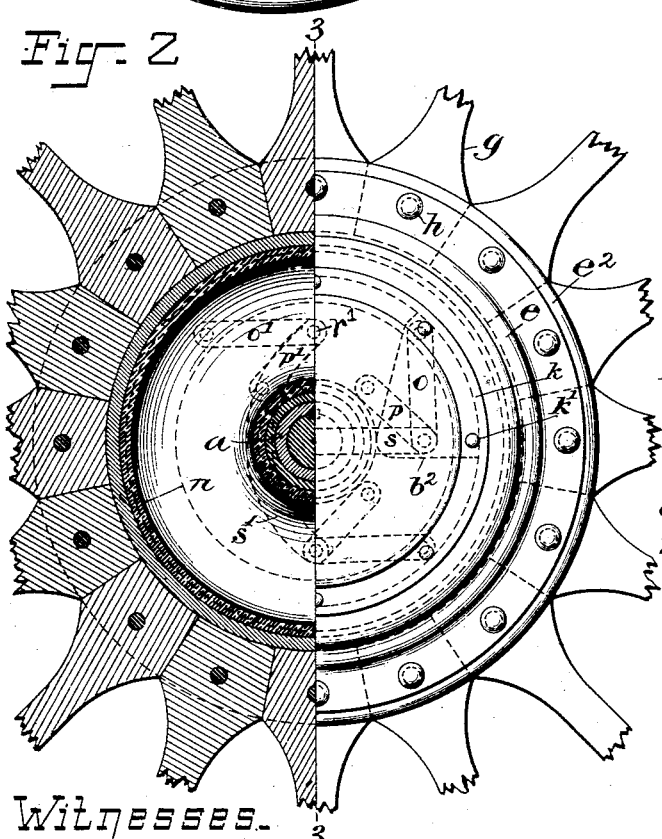
Figure 3:
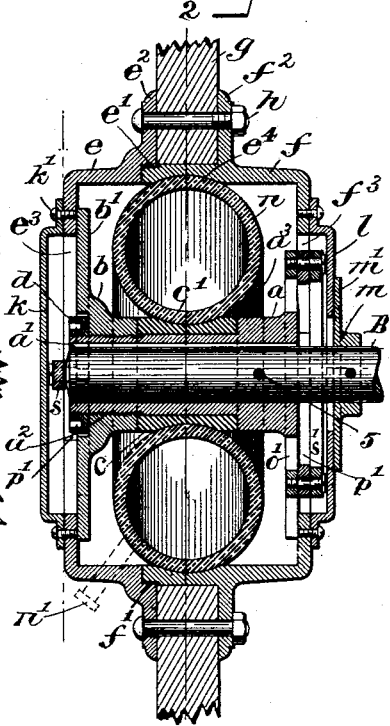

Figure 1 is a side elevation thereof; Fig. 2, a partial sectional view on the line 2 2, Fig. 3. Fig. 3 is a sectional view on the line 3 3, Fig. 2; and Fig. 4 is an outer end view of the wheel-hub with the cover-plate removed.

In the drawings illustrating the particular embodiment of my invention about to be described, the wheel A, of any desired construction, is mounted on a suitable axle B. The wheel-hub consists of a plurality of members, designated for convenience, respectively, as the "inner," "outer," and "intermediate" hub members. The inner hub member comprises a sleeve $a$, fixed on the axle B in any suitable manner, as by a key $a'$, and, if desired, by a pin 5. One end of said sleeve is screw-threaded, as at $a^2$, to receive a short sleeve $b$, which is provided with a flange $b'$. The opposite end of the sleeve $a$ is shouldered, as at $a^3$, and between the shoulder and the sleeve $b$ is mounted a grooved ring $c$, a lock-nut $d$ holding the parts securely in position, as clearly shown in Fig. 3. The outer hub member comprises the opposed cupped members $e$ and $f$, screwed or otherwise fastened together at their meeting edges $e'$ $f'$. These parts $e$ and $f$ are also provided with flanges $e^2$ and $f^2$, respectively, which when the parts are assembled form a channel within which the inner ends of the spokes $g$ of the wheel may be mounted and secured in any suitable manner, as by clamping, between the flanges $e^2$ $f^2$ and by bolts $h$. Axial openings $e^3$ and $f^3$ in the parts $e$ and $f$, respectively, form a passage for the axle B and the parts adjacent thereto. A dust-cap $k$ closes the opening $e^3$ and may be secured in any suitable manner, as by screws $k'$ The opposite opening $f^3$ is closed by a dust-cap $l$, centrally apertured also to receive the axle. Upon the axle is mounted a ring $m$, provided with a flange $m'$, which closes the central aperture in dust-cap $l$ when the parts are assembled. As shown in Fig. 3, the part $e$ has a bearing on the flange $b'$ and the cap $l$ has a bearing on the flange $m'$.

In order to secure radial cushion or yielding action between the wheel-tire at A' and the axle B, suitable yielding, preferably resilient, means—such, for instance, as a closed pneumatic tube $n$—is interposed between the axle and tire, and preferably between the inner and outer hub members. As shown in Fig. 3, this tube has a bearing on the outside of the grooved ring $c$ of the inner hub member and on the inner side of the cupped part $f$ of the outer hub member, also grooved to receive it. The ring $c$ is free to rotate on the sleeve $a$; but such movement is not necessary to the perfect operation of the mechanism, since there is substantially no motion of the outer with relation to the inner hub member, except such as might arise from the loosening of the joints of the connections between these parts. The tube $n$ may be inflated in any suitable manner, as through a nipple $n'$.

By the construction above described a wheel is provided which may be fitted with a solid tire and yet possess all the advantages of a pneumatic-tired wheel.

In order to transmit the driving motion of the inner hub member to the outer wheel member, and consequently to the wheel-tire, or vice versa, without interfering with the yielding or cushion action between these parts due to the presence of the pneumatic tube $n$, I have provided means, shown as a toggle-link connection, which while freely permitting such yielding movement remains rigid against rotative motion between the wheel tire and axle. In the construction selected for illustration four such toggles or two pairs are used. For the sake of convenience these pairs are mounted at opposite ends of the hub.

Referring now particularly to the construction shown in Fig. 4, each toggle connection consists of the members $o$ and $p$, pivoted together at $r$ and at their opposite ends to the outer and inner hub members, respectively. The knuckle-joints $r$ of these toggles are connected by a straight rigid bar $s$, extending diametrically across the hub. The flange $b'$ is cut away to leave openings $b^2$, which permit the members $o$ to lie in the same plane therewith in order that they may be secured on the inner face of part $e$. At the opposite end of the hub and at an angle of ninety degrees from the outer toggles is mounted a second pair of toggles, consisting of the members $o'$ and $p'$, pivoted together at $r'$ and at their opposite ends to the outer and inner hub members, respectively. The knuckle-joints $r'$ of these toggles are connected by a rigid bar $s'$, which is curved, as shown in Fig. 2, to clear the axle B.

By the arrangement of the joined toggle connections described sufficient radial action in all directions is permitted between the inner and outer hub members to allow of full play of the resilient or cushion member $n$, while at the same time rotation between the inner and outer hub members is entirely prevented. Thus there is substantially no wear due to attrition between the hub members and the resilient member $n$. Consequently said member will last indefinitely.

While the embodiment of my invention above described has been proved in practice to be entirely successful and accomplishes the results desired, it is obvious that many changes may be made therein without departing from the spirit and scope of the invention.

What I claim, and desire to secure by Letters Patent, is—

1. In a vehicle-wheel, an inner hub member, an outer hub member, a plurality of jointed connections between said members, a plurality of connecting members between said connections and relatively angularly arranged, whereby relative radial movement is permitted but relative rotary movement is prevented between said members.

2. In a vehicle-wheel, an inner hub member, an outer hub member, a plurality of toggle connections between said members, a plurality of independent members connecting pairs of said toggle connections, whereby relative radial movement is permitted but relative rotary movement is prevented between said members.

3. A vehicle-wheel comprising an inner hub member, an outer hub member, a plurality of jointed driving connections and a resilient member interposed between said members, a plurality of connections between said jointed connections, relatively angularly arranged whereby relative radial movement is permitted but relative rotary movement is prevented between said members.

In testimony whereof I have signed my name to this specification in the presence of two subscribing witnesses.

ROLAND C. HILTON.

Witnesses:
RALPH C. POWELL,
FREDERICK L. EMERY.